United States Patent Office 2,779,601
Patented Jan. 29, 1957

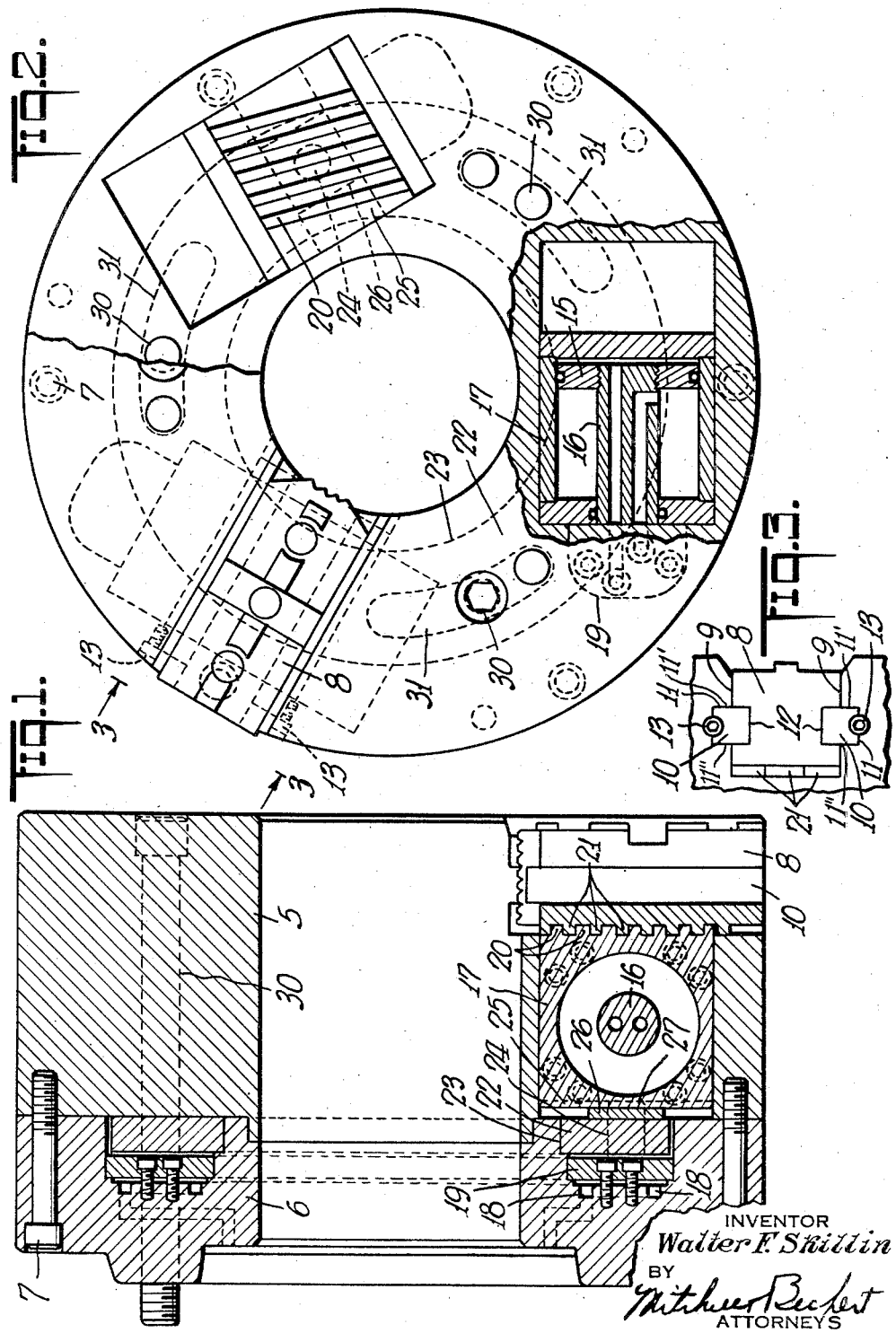

2,779,601

HYDRAULIC CHUCK

Walter F. Skillin, New Britain, Conn., assignor to Union Manufacturing Company, New Britain, Conn., a corporation of Connecticut Application August 16, 1954, Serial No. 449,910

8 Claims. (Cl. 279—4)

My invention relates to a power chuck.

In many chucks, it is difficult to remove the jaws, and sometimes the guides or ways of the chuck become worn and thus impair the accurate fit of the jaws in the chuck body. In some chucks one jaw may not move in proper synchronism with the other jaws, and this is particularly true where a separate motor means acts on each jaw.

It is an object of the invention, therefore, to provide an improved chuck arranged for ready removal of the jaws from the chuck body.

It is another object to provide a chuck having normally radially movable jaws, which jaws may be removed from the body very readily, including removal in a direction parallel to the axis of the chuck.

It is a more specific object to provide a chuck having removable guideways or guide fingers for the jaws.

Another object is to provide a simple means for synchronizing the motions of all of the jaws of a chuck.

Other objects and various features of novelty and invention will be hereinafter pointed out or will become apparent to those skilled in the art.

In the drawings which show, for illustrative purposes only, a preferred form of the invention:

Fig. 1 is a diametral, sectional view through a chuck, illustrating features of the invention;

Fig. 2 is a front view of the chuck illustrated in Fig. 1 and showing one jaw in place and showing mechanism in connection with the other two jaws, which latter have been omitted from the drawings; and Fig. 3 is a fragmentary, radial view of the chuck illustrating one jaw, and removable guide means for guiding the same in its normal radial sliding movement in the chuck body.

The general features of the chuck herein illustrated are similar to those of the chuck illustrated in my copending application, Serial No. 417,854, filed March 22, 1954, to which application reference is made for a fuller explanation of some features shown but not claimed in the present case.

In the form shown, the chuck body, to be attached to a spindle, consists of a forward or main body section 5, and a rear body section 6, secured to the front body section as by means of screws 7 or the like, as will be understood. The chuck illustrated has three radially sliding jaws such as 8, equally spaced about the chuck. These jaws 8 fit in guideways 9, as shown particularly in Figs. 2 and 3. Normally, radially sliding jaws have guides or guide fingers integral therewith, which fit or slide in suitable guideways in the chuck body. However, when wear takes place, such chuck jaws are likely to become loose and lose the fine fit which they originally had. Normally radially sliding jaws are removed radially from the chuck body.

In my improved chuck, the chuck jaws 8 fit in the slideways 9 and are held therein as by means of guide fingers 10—10, one being shown at each side of the jaw. These guide fingers are radially removable and in the form illustrated are about square and fit accurately in opposed, facing slots or grooves 11—11 in the sides of the slideway 9. These slots or grooves are defined at the axially outer and inner sides by integral, radial abutment surfaces 11', 11" for rigidly sustaining the ribs or guide fingers 10, 10 held between such surfaces. The jaw 8 has corresponding slots 12 facing the slots 11, 11 for the reception of the guide fingers 10, and there is a nice sliding fit between these guide fingers 10 and the chuck jaw itself. These guide fingers 10 are removably held in the slots 9 in the chuck body by any suitable means, such as the screws 13, which may be threaded into the chuck body itself and the guide fingers 10. The head of the screw 13 may bottom in a counterbore in the chuck body and fit over the end of the guide finger 10. Thus, when the guide fingers are in place, the chuck jaw may be moved radially, and when it is desired to change chuck jaws or, in general, when it is desired to remove them, the guide fingers 10—10 are separated from the jaws or may be pulled out with the jaws. Thus, by removing the screws 13, the guide fingers 10 may be forced out in a radial direction, and under proper conditions, when the jaw is free to move radially for removal, the jaw too may be removed radially with the guide fingers. However, if the jaw is not free to move radially to an extent sufficient to separate it from the chuck body, it may be removed in a generally axial direction. When such axial removal is desired, the guide fingers 10 are removed and it will be seen that the chuck jaw 8 may then be lifted out in a direction axially of the chuck body and need not be slid out radially as with most chuck jaws. In case of excessive wear, the chuck body and jaw may be refinished and new guide fingers installed. The screws 13 take none of the axial stress of the jaws.

In the particular chuck illustrated, each jaw is designed to coact with an operating mechanism which prevents radial removal of the jaw from the chuck body, so it is important that they be removable in a generally axial direction, as described. In the present case and in the application heretofore referred to, the jaws are moved by motor means carried by the chuck itself, and preferably there is a separate motor means for each jaw. In order to synchronize the motions of all jaws so that one may not be moved to a greater extent than another, I provide synchronizing means to be described. In this case and in the copending case already referred to, there is a piston 15 carried by a piston rod 16, and this rod has passages for the passage of fluid to the head end or the tail end of the piston. The axis of the piston and cylinder means extends at right angles to the radial line of the chuck. The piston fits in a cylinder 17 so that, upon the application of pressure to one end or the other of the piston, the cylinder is moved back and forth. The fluid connections for admitting fluid to the piston may consist of annular passages 18—18 in the rear chuck portion 6, and there are passages in a fixed block 19 connected to the piston rod 16 and having passages connecting the supply passages to the piston rod passages. As illustrated in the copending application referred to, the cylinder has transversely inclined teeth 20 for engagement with correspondingly inclined teeth 21 on the bottom of the chuck jaws. Thus, when the cylinder 17 is reciprocated, the teeth 20—21 cause the jaw 8 to move radially in and out.

In the copending application referred to, the cylinder 17 may be moved to one extreme position, and thus free the teeth 20—21 from each other, after which the jaw may be slid out radially. However, in the present instance I have provided means, as heretofore described, for removing the jaw in an axial direction, and therefore the teeth 20—21 may be longer and provide greater and smoother motion to the jaws than in the case where they would be moved to extreme position to permit jaw removal.

In the present case, each jaw is provided with a motor means, and it is desirable to cause all of the jaws to move together and to the same extent. I have, therefore, provided means for synchronizing the movement of all of the jaws. In the chuck body, and preferably in the rear section 6 thereof, there is a plate 22 which is mounted for rotative movement in an annular groove 23 in the chuck body. Generally speaking, it may be said that the ring 22 is held between the front and rear sections 5—6 of the chuck body. The ring 22 is secured to all of the jaws and motor means for the jaws, and in the form illustrated I provide for each jaw a pin 24 which may be a drive fit in the ring 22, and which may project toward the jaw. The bottom of each motor means or jaw may have a transverse slot 25 therein, which slot carries an angular disc or plate 26, which may slide freely back and forth in a radial direction in the groove in the motor means or cylinder body. There is a hole in the angular block 26 for the reception of the end 27 of the pin 24. Thus, when one of the motor means moves, due to the application of hydraulic or other force, the pin 24, being connected to the motive means and to the ring 22, will cause the latter to rotate in the body. Now, since each of the motor means is provided with an angular disc 26 and there is a pin 24 for each jaw or motor means, all of the motor means or jaws will be forced to move in unison, due to the fact that all are coupled together through the medium of the ring 22 and the connections between that ring and the various motor means or jaws. By the simple means illustrated, it will be clear that all of the jaws will be moved in unison when one of the jaws is moved, and, theoretically, all of the jaws may be moved by a single motor means, but, as a practical matter, I prefer to provide a separate motor means for each jaw. In any event, all jaws will be properly moved in unison.

In the form shown, the chuck body is connected to a spindle by means of screws 30 which pass through both front and rear sections of the chuck body and through annular slots 31 in the synchronizing ring 22. Thus the ring 22 may turn freely within the proper limits of the slots 31.

The pressure fluid to and from the cylinders may be by means substantially as shown in my said copending application.

It will be seen that I have provided a very simple power chuck having means for causing all jaws to be moved in unison and in which the jaws may be removed from the chuck body in a direction parallel to the axis thereof.

While the invention has been described in considerable detail and a preferred form illustrated, it is to be understood that changes and modifications may be made within the scope of the invention as defined in the appended claims.

I claim:

1. In a chuck, a chuck body, a chuck jaw, movable radially of the body, removable guide ribs to guide said jaw in its radial movement, said body having radial facing slots defined by axially outer and inner radial abutment surfaces, said guide ribs being in said slots and held by said axially outer abutment surfaces against axial withdrawal, means for removably holding said guide ribs in place against radial withdrawal, whereby said guide ribs may be released from said body and withdrawn radially to release said jaw and permit withdrawal of said jaw.

2. In a chuck, a chuck body, a chuck jaw, said body having an opening for receiving said jaw, a pair of guide ribs acting between said chuck body and said jaw for guiding said jaw for radial reciprocation in said body, said body having a pair of opposed facing radial slots including axially top and bottom abutment surfaces for said ribs to hold the latter against axial movement but to permit radial movement, means for removably holding said guide ribs in place in a radial direction, whereby said guide ribs may be removed radially and said jaw thus released and readily removed from said body.

3. In a power chuck, a chuck body, a plurality of jaws, a separate rectilinearly guided member for moving each of said jaws on said body, a ring mounted for rotation in said body, motor means for rotating said ring on said body, means connecting said motor means and said ring for moving the latter, whereby movement of said motor means will be transmitted through said ring to said rectilinearly guided members and said jaws.

4. In a chuck, a chuck body, said chuck body having a radially extending opening to receive a chuck jaw, a chuck jaw in said opening, said opening at the sides having radially extending grooves opening toward each other and being defined at the tops by abutment surfaces, guide fingers in said grooves and sustained by said abutment surfaces against axial removal, said jaw and said guide fingers having interengaging sliding abutment surfaces to permit radial sliding of said jaw and to prevent axial removal of said jaw, said guide fingers being radially removable from said grooves to release said jaw for removal from said radial opening, and means for removably holding said guide fingers against removal from said grooves.

5. In a chuck, a chuck body, a plurality of chuck jaws movable radially thereon, a separate jaw moving member for each jaw, motor means for moving one of said jaw moving members to move its jaw, a ring mounted for rotary movement in said chuck body, a connection between said motor means and said ring for rotating the latter in said body, and pin means of connection between said ring and the others of said jaw moving members, whereby all the jaws may be actuated by one motor means and all will act in unison.

6. In a chuck, a chuck body, a plurality of jaws movable radially thereon, a separate jaw actuator for each said jaw, means for guiding said jaw actuators for linear movements, a ring mounted for rotation in said body, a pin and slot connection between said ring and each of said jaw actuators, whereby movement of said ring in said body will cause all of said actuators to move in unison.

7. In a chuck, a chuck body, a plurality of jaws movable radially in said body, a separate jaw actuator for each said jaw, a ring mounted for rotary movement in said body, each said jaw actuator having a transverse slot therein extending in a generally radial direction, a block slidable in said slot, and a connection between all of said blocks and said ring, whereby upon rotation of said ring in said body all of said jaw actuators will move in unison.

8. In a chuck, a chuck body, a plurality of chuck jaws slidable radially thereon, a separate chuck actuator for each jaw, said actuators being guided for rectilinear movement in a generally tangential direction, a ring rotatable in said body, a pin and slot connection between said ring and said jaw actuators including slots extending in a generally radial direction, whereby said ring may rotate in said body and said actuators may move in a generally tangential direction while said pin and slot connections remain operative, whereby upon rotation of said ring said jaw actuators will act in unison.

References Cited in the file of this patent

UNITED STATES PATENTS

| | | |
|---|---|---|
| 1,784,908 | Regan | May 28, 1928 |
| 2,513,284 | Church | July 4, 1950 |
| 2,587,893 | Pudy et al. | Mar. 4, 1952 |
| 2,597,489 | Huntting | May 20, 1952 |
| 2,655,383 | DiPalo | Oct. 13, 1953 |